United States Patent
Borlick et al.

(10) Patent No.: US 11,157,355 B2
(45) Date of Patent: Oct. 26, 2021

(54) MANAGEMENT OF FOREGROUND AND BACKGROUND PROCESSES IN A STORAGE CONTROLLER

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Trung N. Nguyen, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 16/459,475

(22) Filed: Jul. 1, 2019

(65) Prior Publication Data
US 2019/0324845 A1  Oct. 24, 2019

Related U.S. Application Data

(63) Continuation of application No. 15/370,511, filed on Dec. 6, 2016, now Pat. No. 10,379,943.

(51) Int. Cl.
*G06F 11/10* (2006.01)
*G06F 3/06* (2006.01)
*G06F 9/4401* (2018.01)

(52) U.S. Cl.
CPC .......... *G06F 11/106* (2013.01); *G06F 3/0659* (2013.01); *G06F 3/0605* (2013.01); *G06F 3/0689* (2013.01); *G06F 9/4401* (2013.01)

(58) Field of Classification Search
CPC ..... G06F 3/0659; G06F 9/4401; G06F 11/106
See application file for complete search history.

(56) References Cited

U.S. PATENT DOCUMENTS

| | | | |
|---|---|---|---|
| 8,473,778 B2 | 6/2013 | Simitci et al. | |
| 2007/0220227 A1 | 9/2007 | Long | |
| 2008/0222734 A1 | 9/2008 | Redlich et al. | |
| 2013/0073797 A1* | 3/2013 | Chowdhury | G11C 16/3418 711/103 |
| 2016/0188220 A1* | 6/2016 | Nemoto | G06F 3/0611 711/103 |
| 2016/0342465 A1 | 11/2016 | Cudak et al. | |
| 2018/0157498 A1 | 6/2018 | Borlick et al. | |

OTHER PUBLICATIONS

Office Action 1 for U.S. Appl. No. 15/370,511, dated Nov. 30, 2018, 10 pp. [18.691 (OA1)].

(Continued)

*Primary Examiner* — Albert Wang
(74) *Attorney, Agent, or Firm* — Konrad Raynes Davda & Victor LLP; Rabindranath Dutta

(57) ABSTRACT

A background process is configured to periodically scrub a boot storage of a storage controller to ensure operational correctness of the boot storage. One or more foreground processes store a system configuration data of the storage controller in the boot storage of the storage controller. The background process and the one or more foreground processes are executed to meet predetermined performance requirements for the background process and the one or more foreground processes.

18 Claims, 8 Drawing Sheets

(56) References Cited

OTHER PUBLICATIONS

Response to Office Action 1 for U.S. Appl. No. 15/370,511, dated Febraury 28, 2019, 20 pp. [18.691 (ROA1)].
Notice of Allowance 1 for U.S. Appl. No. 15/370,511, dated Mar. 29, 2019, 10 pp. [18.691 (NOA1)].
List of IBM Patents or Patent Applications Treated as Related, Jul. 1, 2019 2 pp. [18.691C1 (Appendix P)].

* cited by examiner

MANAGEMENT OF FOREGROUND AND BACKGROUND PROCESSES IN A STORAGE CONTROLLER

CROSS-REFERENCE TO RELATED APPLICATION

This application is a continuation of U.S. patent application Ser. No. 15/370,511, filed Dec. 6, 2016, which application is incorporated herein by reference in its entirety.

BACKGROUND

1. Field

Embodiments relate to the management of foreground and background processes in a storage controller.

2. Background

A storage controller may control access to storage for one or more host computational devices that may be coupled to the storage controller over a network. A storage management application that executes in the storage controller may manage a plurality of storage devices, such as disk drives, tape drives, flash drives, direct access storage devices (DASD), etc., that are coupled to the storage controller. A host may send Input/Output (I/O) commands to the storage controller and the storage controller may execute the I/O commands to read data from the storage devices or write data to the storage devices.

A boot disk is a removable digital data storage medium from which the storage controller may load and boot an operating system and/or other programs. In the event of a power failure or certain types of shutdown of the storage controller, the storage controller loads and boots the operating system and the programs from the boot disk, in an attempt to restore the storage controller and associated components to the configuration prior to the power failure or the shutdown.

SUMMARY OF THE PREFERRED EMBODIMENTS

Provided are a method, system, and computer program product in which a background process is configured to periodically scrub a boot storage of a storage controller to ensure operational correctness of the boot storage. One or more foreground processes store a system configuration data of the storage controller in the boot storage of the storage controller. The background process and the one or more foreground processes are executed to meet predetermined performance requirements for the background process and the one or more foreground processes.

In certain embodiments, the predetermined performance requirements include executing the background process at least once in a predetermined interval of time, and completing execution of each of the one or more foreground processes within a predetermined amount of time.

In further embodiments, execution of the background process is started. In response to completion of the execution of the background process, a priority of the background process is reduced. In response to determining that the execution of the background process has not completed in a predetermined amount of time, the priority of the background process is increased.

In additional embodiments, the background process is configurable to have at least two priorities including a low priority and a high priority, wherein the high priority is a higher priority than the low priority. In response to starting a foreground process, the storage controller performs operations including: in response to determining that the background process has the low priority, suspending, aborting, or throttling the background process; and, in response to determining that the background process has the high priority, suspending, aborting, or throttling the foreground process.

In further embodiments, in response to starting an execution of a foreground process, the storage controller performs operations, the operations comprising: in response to determining that a number of executing foreground processes is less than a first predetermined threshold, throttling the background process; and in response to determining that the number of the executing foreground processes is greater than a second predetermined threshold, suspending the background process, and subsequent to suspending the background process, resuming the background process after a predetermined period of time if the number of the executing foreground processes fall below the first predetermined threshold and aborting the background process after the predetermined period of time if the number of the executing foreground processes do not fall below the second predetermined threshold.

In certain embodiments, a priority of the background process is set based on how many times the background process has been aborted since a last completion of the background process.

In further embodiments, in response to starting an execution of a background process if a number of executing foreground processes are greater than a predetermined threshold, then some or all of the one or more foreground processes are suspended.

BRIEF DESCRIPTION OF THE DRAWINGS

Referring now to the drawings in which like reference numbers represent corresponding parts throughout.

DETAILED DESCRIPTION

Figure 1:
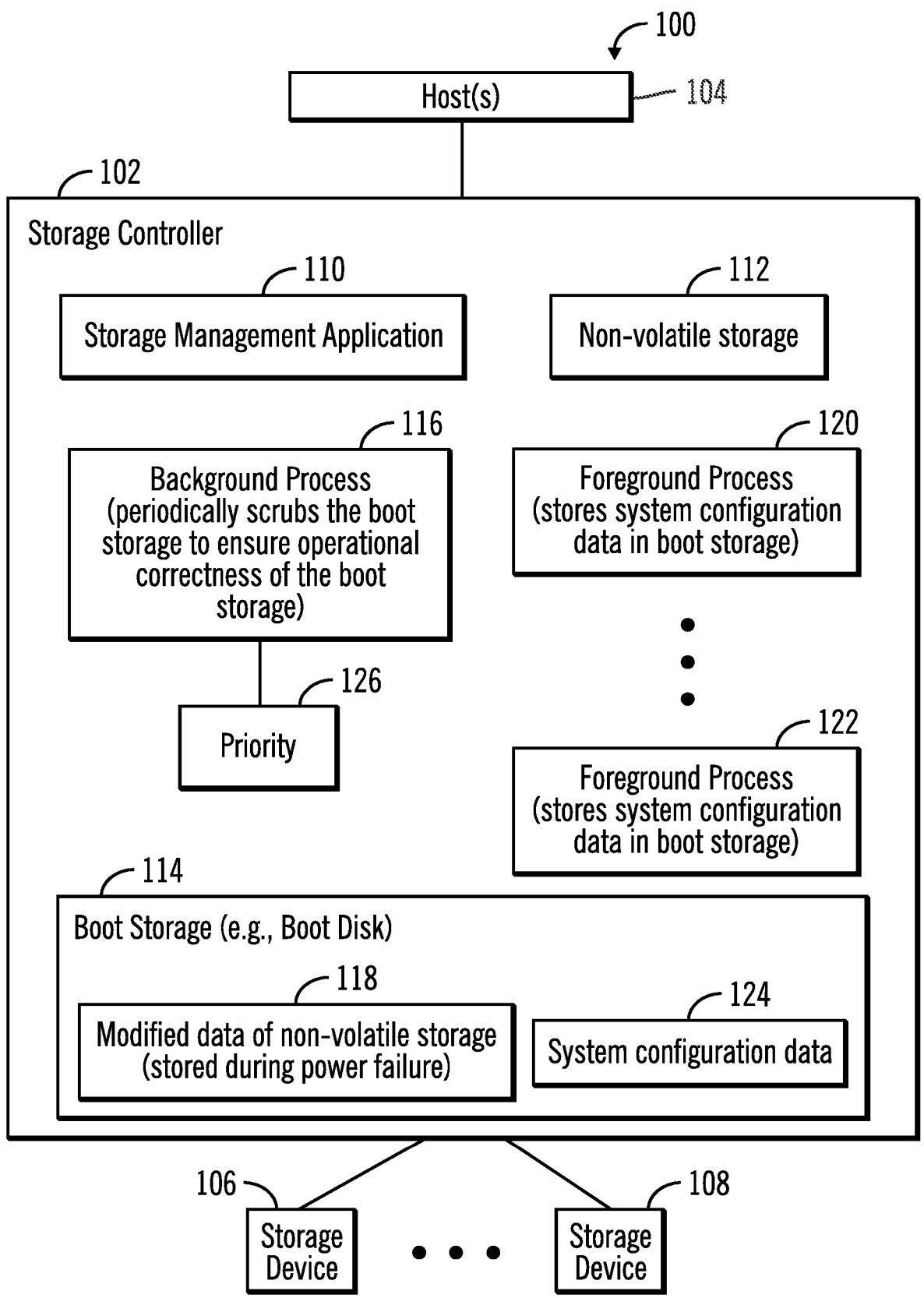
FIG. 1 illustrates a block diagram of a computing environment comprising a storage controller with a boot storage, in accordance with certain embodiments.

In the following description, reference is made to the accompanying drawings which form a part hereof and which illustrate several embodiments. It is understood that other embodiments may be utilized and structural and operational changes may be made.

Certain embodiments provide a mechanism in which a background process is configured to periodically scrub a boot storage of a storage controller to ensure operational correctness of the boot storage, and one or more foreground processes store system configuration data in the book disk of the storage controller. Modified data of non-volatile storage of the storage controller is stored in the boot storage during a power failure event, prior to a complete shutdown of the storage controller. The background process and the one or more foreground processes are managed such that execution of the background process and the one or more foreground processes meet predetermined performance requirements. In certain embodiments, the predetermined performance requirements include executing the background process at least once in a predetermined interval of time (e.g., once very day), and completing execution of each of the one or more foreground processes within a predetermined amount of time (e.g., within 30 seconds of starting). Throttling, suspension, or aborting of one or more of the background and foreground processes, and adjustment of a priority of the background process may be performed to meet the predetermined performance requirements. Certain embodiments balance the execution of a background process with the execution of foreground processes to ensure that the foreground processes have priority over the background process, while also ensuring that the background process eventually completes.

For example, in certain embodiments, if an execution of the background process fails to complete because of preference being provided to the execution of one or more foreground processes then the priority of the background process is increased. If the background process starts with a high priority (e.g., after being aborted many times since the last completion of the background process) and the number of executing foreground processes is many, then one or more of the foreground processes may be suspended to allow the background process to execute. It may be noted that embodiments provided below illustrate many different variations of throttling (i.e., reducing I/O rate), suspension, or aborting of one or more of the background and foreground processes, and adjustment of the priority of the background process.

As a result, time contention for the same resource on the boot disk by the background process and the one of more foreground processes is reduced. The background process may be expected to execute at least once every predetermined amount of time (e.g., every 24 hours). If foreground processes preempt the execution of the background process repeatedly, a situation may arise in which the background process is unable to execute at least once in the predetermined amount of time. To avoid such a situation, the priority of the background process is increased each time the background process is suspended or aborted to allow a foreground process to be executed. As a result, certain embodiments avoid significant slowdown of the foreground processes and the predetermined performance requirements of the foreground processes are met, while at the same time also making sure that the background process is allowed to execute at least once every predetermined amount of time. Therefore, a balance is struck between the need for relatively rapid execution of the one or more foreground processes, and the need for the background process to execute at least once every predetermined amount of time.

Exemplary Embodiments

FIG. 1 illustrates a block diagram of a computing environment 100 comprising a storage controller 102 coupled to one or more hosts 104 and one or more storage devices 106, 108. The storage controller 102 receives I/O requests from the one or more hosts 104, and responds to the I/O requests by performing read or write operations with respect to logical storage volumes, where the logical storage volumes correspond to physical storage volumes maintained in the plurality of storage devices 106, 108.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The storage controller 102 and the hosts 104 may be elements in any suitable network, such as, a storage area network, a wide area network, the Internet, an intranet, etc. In certain embodiments, the storage controller 102 and the hosts 104 may be elements in a cloud computing environment. The storage devices 106, 108 may comprise any suitable storage device including those presently known in the art, such as disk drives, solid state drives, etc.

A storage management application 110 may execute in the storage controller 102, where the storage management application 110 interfaces with host applications that execute in the hosts 104. The storage management application 110 provides I/O access to the host applications. The storage management application 110 may also perform various other tasks to configure and maintain various processes that execute in the storage controller 102. In certain embodiments, the storage management application 110 may be implemented in software, hardware, firmware or any combination thereof.

The storage controller 102 may include a non-volatile storage 112 and a boot storage 114, where the boot storage 114 may in certain embodiments comprise a boot disk. A background process 116 may periodically scrub the boot storage 114 of the storage controller 102 to ensure operational correctness of the boot storage 114. In certain embodiments, the scrubbing by the background process 116 may include reading and checking for defective blocks in selected regions of the boot storage 114, before applications actually need to access the selected regions of the boot storage 114. Other functions related to ensuring the operational correctness of the boot storage 114 may also be performed by the background process 116.

When a power failure event starts occurring in the storage controller 102, the storage management application 110 ensures that the modified data of the non-volatile storage 112 is stored in the boot storage 114, prior to the complete shutdown of the storage controller 102 as a result of the completion of the power failure. The modified data of the non-volatile storage 112 as stored in the boot storage 114 is shown via reference numeral 118. The periodic scrubbing of the boot storage 114 by the background process 116 ensures that the boot storage 114 operates correctly during the power failure, and as a result the modified data of the non-volatile storage 112 is properly stored in the correctly operating boot storage 114, prior to the completion of the power failure. One or more foreground processes 120, 122 may store system configuration data in boot storage 114, where the system configuration data stored in the boot storage 114 is shown via reference numeral 124. Therefore, the boot storage 114 stores both the modified data of the non-volatile storage 118 and the system configuration data 124.

The modified data of non-volatile storage 118 stored in the boot storage 124 is used for restoring data for the non-volatile storage 112, in the event of a power loss.

Modified data is data that has written to the non-volatile storage 112 via I/O from the hosts 104, where the modified data may not have been destaged (i.e., moved or copied) to the storage devices 106, 108. The system configuration data 124 stored in the boot storage may include information about the configuration of the storage controller 102 and associated components. For example, when a rank is configured, the configuration information of the rank may be placed in the system configuration data 124 stored in the storage controller 102. In the event of a power failure or shutdown of the storage controller 102, the modified data of non-volatile storage 118 and the system configuration data 124 may be used to configure the storage controller 102 and update the non-volatile storage 112.

In certain embodiments, a customer may create a large number of storage arrays using a function named "mkArray" and this may lead to a generation of a large amount of system configuration data, i.e., the "mkArray" function may cause objects for system configuration data 124 to be created in the boot storage 114. However, in certain situations, the background process 116 gets started and creation of the system configuration data 124 gets slowed down so much that foreground processes 120, 122 (e.g., the processes corresponding to the "mkArray" functions) may start timing out. If the boot storage 114 is a boot disk, then with large amounts of writes for the system configuration data 124 and the concurrent execution of the background process 116 that scrubs at least certain regions the boot disk 114 on which the modified data of the non-volatile storage 118 may be written during a power failure event, a large amount of movement of the disk head occurs and this slows down both the foreground processes 120, 122 and the background process 116.

A straightforward solution may be to suspend the background process 116 when the foreground processes 120, 122 are running. A problem with this straightforward solution is that foreground processes 120, 122 may run for long periods of time and the background process 116 may not run for days. This may cause starvation (i.e., no execution) of the background process 116 for a long time and hence the storage controller 102 may not detect any problems with the background process 116 for days if such a problem were to occur. Certain embodiments balance the execution of the background process 116 with the execution of the foreground processes 120, 122 by at least changing the priority 126 (i.e., priority of execution) of the background process 116.

Figure 2:
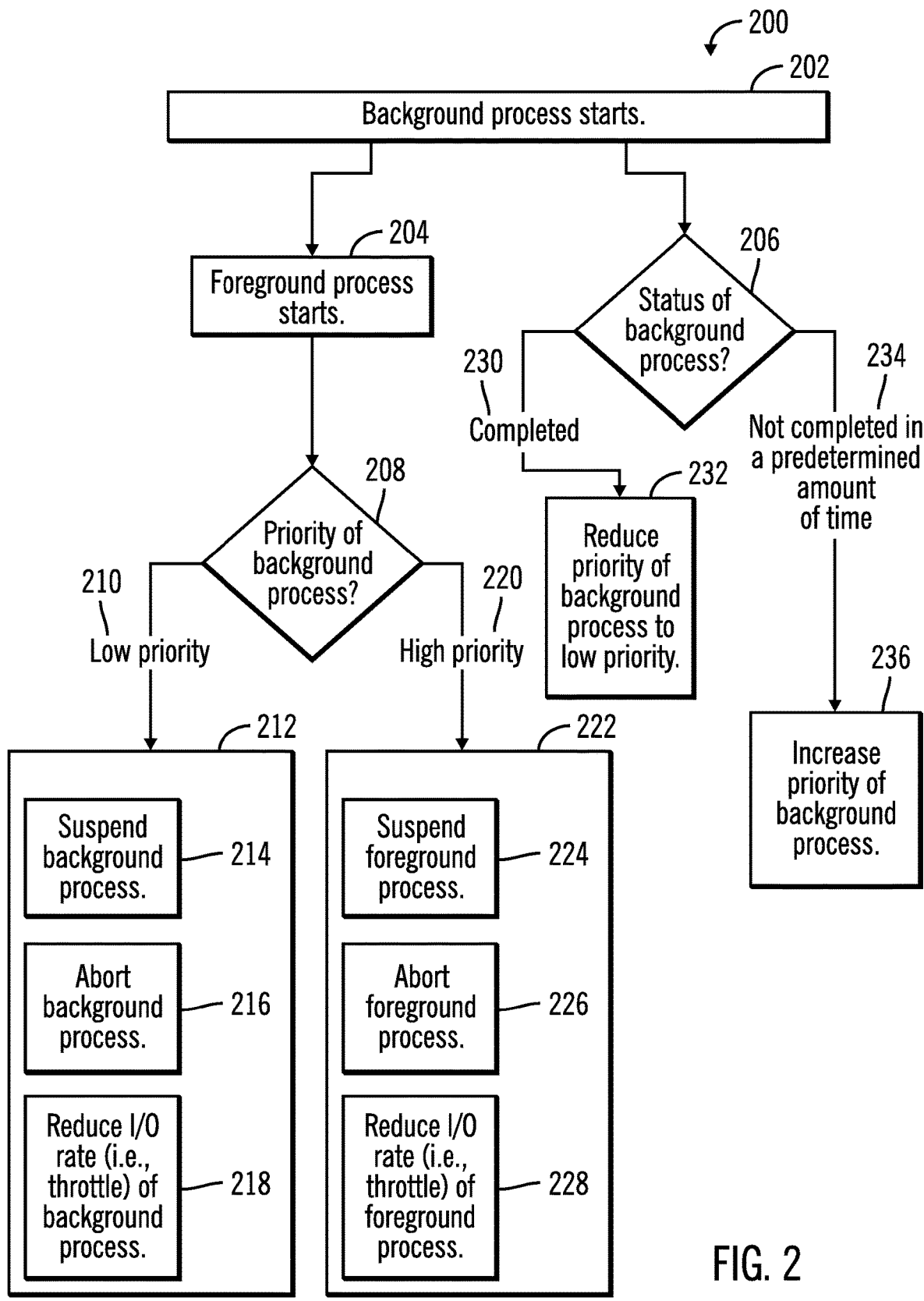
FIG. 2 illustrates a flowchart that shows operations performed after a background process starts, in accordance with certain embodiments.

FIG. 2 illustrates a flowchart 200 that shows operations performed after a background process 116 starts, in accordance with certain embodiments. The operations shown in FIG. 2 may be performed by the storage management application 110 that controls the execution of the background process 116 and the foreground processes 120, 122.

Control starts at block 202 in which the background process starts 116, and control may proceed to blocks 204 and block 206 in parallel.

At block 204, a foreground process 120 starts, and control proceeds to block 208 in which the priority of the background process 116 is determined. If the priority is a low priority (reference numeral 210) then control proceeds to block 212 in which the background process 116 may be suspended 214, aborted 216, or throttled (i.e., I/O rate reduced) 218. If the priority is a high priority (reference numeral 220) then control proceeds to block 222 in which the foreground process 120 may be suspended 224, aborted 226, or throttled 228. The low priority 210 and high priority 220 may comprise numerical values for priority of execution where a higher numerical value shows a higher priority. In certain embodiments, the low priority 210 may be a priority that is less than a first predetermined threshold value, and the high priority 220 may be a priority that is greater than a second predetermined threshold value. In other embodiments, priority values lesser than a predetermined value are low priorities, and priority values greater than the predetermined value are high priorities.

At block 206, the storage management application 110 checks the status of the background process 116. If the background process 116 has completed (reference numeral 230) then the priority of the background process 116 is reduced (at block 232) to a low priority (at block 232). If the background process 116 has not completed within a predetermined amount of time (reference numeral 234) then the priority of the background process 116 is increased.

Therefore, FIG. 2 shows certain embodiments in which an execution of the background process 116 is started. In response to completion of the execution of the background process 116, a priority 126 of the background process 116 is reduced. In response to determining that the execution of the background process 116 has not completed in a predetermined amount of time, the priority 126 of the background process 116 is increased. The background process 116 is configurable to have at least two priorities including a low priority and a high priority, wherein the high priority is a higher priority than the low priority. In response to starting a foreground process 120, the storage controller 102 performs operations including: in response to determining that the background process 116 has the low priority, suspending, aborting, or throttling the background process 116; and in response to determining that the background process 116 has the high priority, suspending, aborting, or throttling the foreground process.

Figure 3:
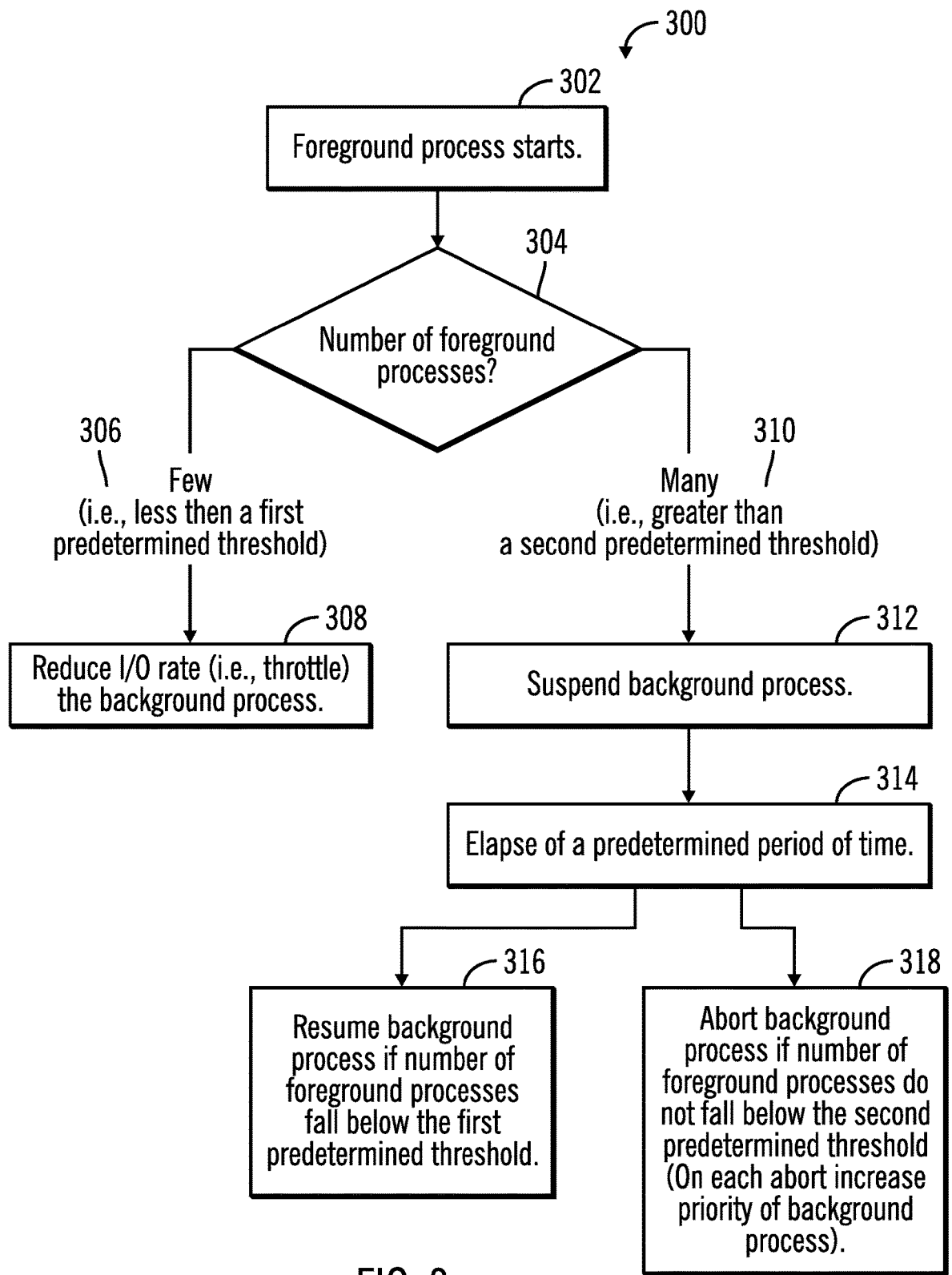
FIG. 3 illustrates a flowchart that shows operations after a foreground process starts, in accordance with certain embodiments.

FIG. 3 illustrates a flowchart 300 that shows operations after a foreground process 120 starts, in accordance with certain embodiments. The operations shown in FIG. 3 may be performed by the storage management application 110 that controls the execution of the background process 116 and the foreground processes 120, 122.

Control starts at block 302 in which a foreground process 120 starts. The storage management application 110 determines the number of foreground processes that are executing (at block 304). If the number of foreground processes that are executing are few 306 (i.e., less in number than a first predetermined threshold), then the background process 116 is throttled (at block 308).

If the number of foreground processes that are executing are many 310 (i.e., greater in number than a second predetermined threshold) then control proceeds to block 312 in which the storage management application 110 suspends (at block 312) the background process 116. A predetermined period of time elapses (at block 314) and control proceeds in parallel to blocks 316 and 318.

At block 316, the storage management application 110 resumes the background process if the number of foreground process fall below the first predetermined threshold (i.e., the executing foreground processes become few in number). At block 318, the storage management application aborts the background process 116 if the number of foreground processes do not fall below the second predetermined threshold (i.e., many foreground processes are still executing). On each abort of the background process, the priority 126 of the background process 116 is increased.

Therefore, FIG. 3 shows certain embodiments in which, in response to starting an execution of a foreground process 120, the storage controller 102 performs operations, the operations comprising: in response to determining that a number of executing foreground processes is less than a first predetermined threshold, throttling the background process; and in response to determining that the number of the executing foreground processes is greater than a second predetermined threshold, suspending the background process, and subsequent to suspending the background process, resuming the background process after a predetermined period of time if the number of the executing foreground processes fall below the first predetermined threshold and aborting the background process after the predetermined period of time if the number of the executing foreground processes do not fall below the second predetermined threshold.

Figure 4:
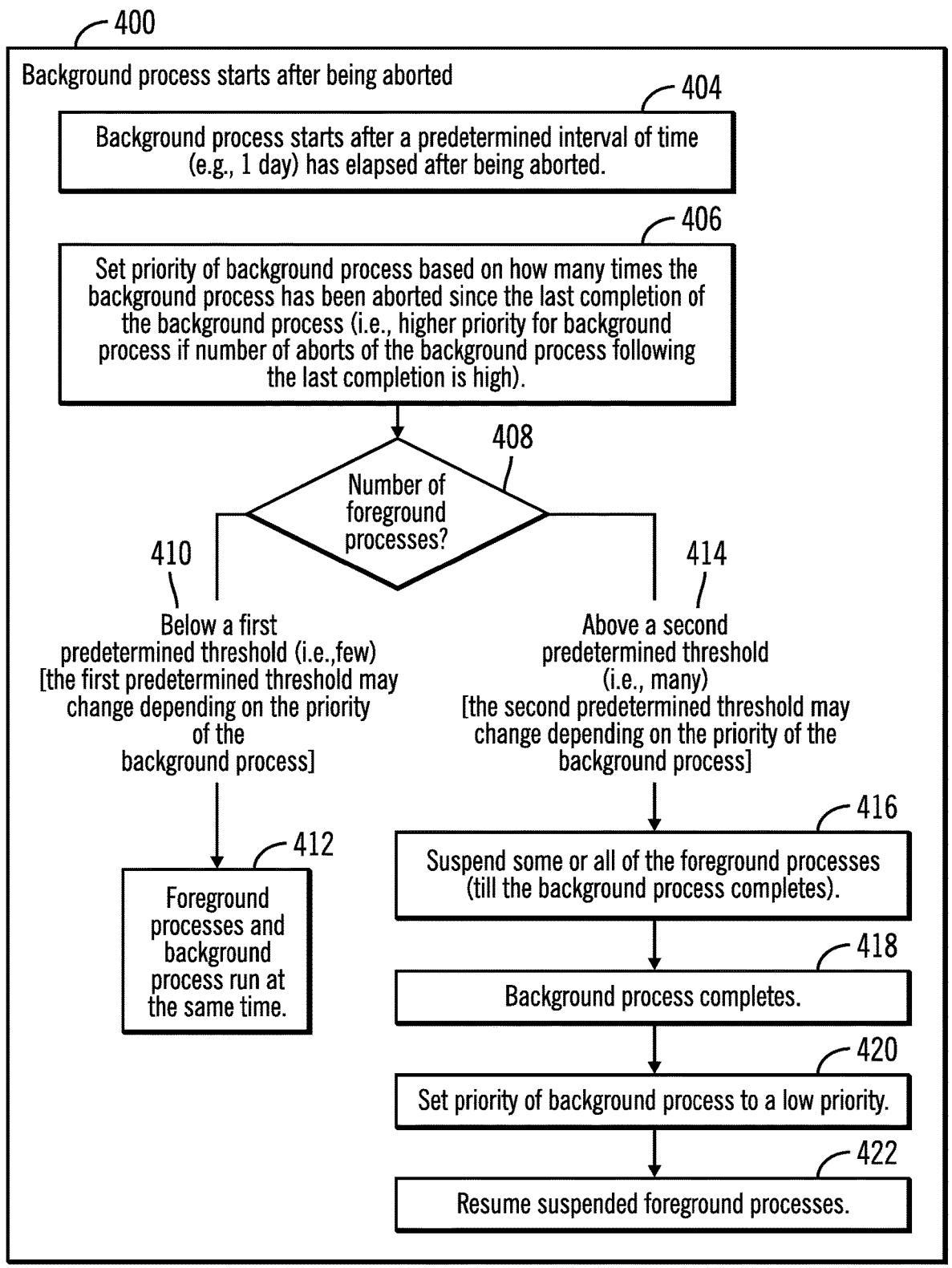
FIG. 4 illustrates a flowchart that shows operations after a background process starts subsequent to being aborted, in accordance with certain embodiments.

FIG. 4 illustrates a flowchart 400 that shows operations after a background process 116 starts subsequent to being aborted, in accordance with certain embodiments. The operations shown in FIG. 4 may be performed by the storage management application 110 that controls the execution of the background process 116 and the foreground processes 120, 122.

Control starts at block 404 in which a background process 116 starts after a predetermined interval of time (e.g., 1 day) has elapsed after the background process 116 had been last aborted. Control proceeds to block 406 in which the storage management application 110 sets the priority 126 of the background process 116 based on how many times the background process 116 has been aborted since the last completion of the background process 116 (i.e., high priority is set for the background process 116 if number of aborts of the background process 116 following the last completion is high).

From block 406 control proceeds to block 408 in which the storage management application 110 determines the number of foreground processes that are executing. If the number of foreground processes are below a first predetermined threshold 410 (i.e., few) control proceeds to block 412 in which the foreground processes 120, 122 and the background process 120 run at the same time in parallel.

If the at block 408 it is determined that the number of foreground processes that are executing are above a second predetermined threshold (i.e., many), then some or all of the foreground processes are suspended (at block 416) until the background process 116 completes (at block 418). Once the background process 116 completes, the priority of the background process 116 is set to a low priority at block 420) and the suspended foreground processes are resumed (at block 422).

Therefore, FIG. 4 illustrates certain embodiments in which the priority 126 of the background process 116 is set based on how many times the background process 116 has been aborted since a last completion of the background process 116. Additionally, in response to starting an execution of a background process 116 if a number of executing foreground processes are greater than a predetermined threshold, then some or all of the one or more foreground processes are suspended, if the background process has a sufficiently high priority (e.g., after one or more aborts of the background process).

Figure 5:
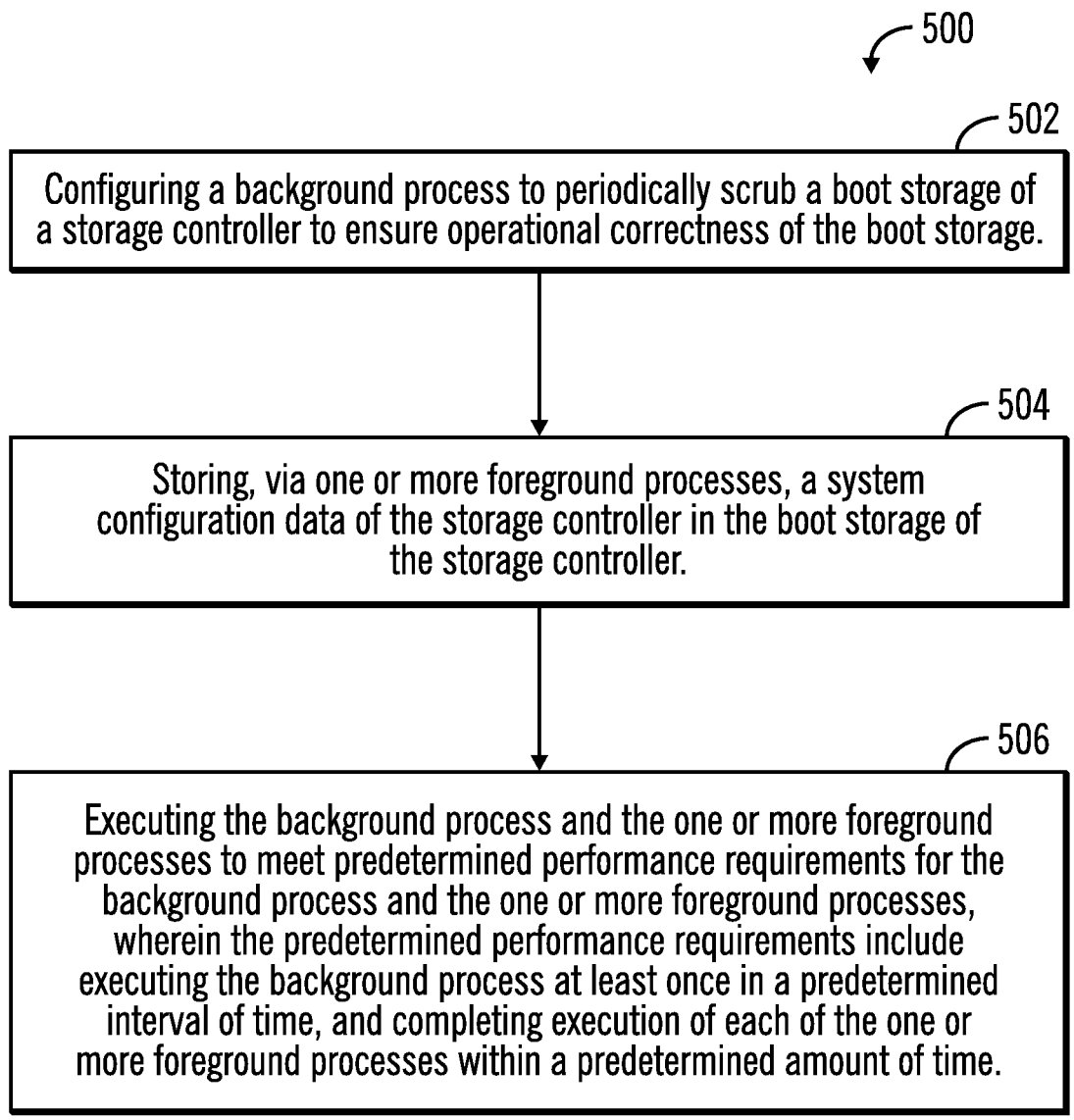
FIG. 5 illustrates a flowchart that shows operations for management of a background process and foreground processes, in accordance with certain embodiments.

FIG. 5 illustrates a flowchart that shows operations for management of a background process and foreground processes, in accordance with certain embodiments. The operations shown in FIG. 5 may be performed by the storage management application 110 that controls the execution of the background process 116 and the foreground processes 120, 122.

Control starts at block 502, in which a background process 116 is configured to periodically scrub a boot storage 114 of a storage controller 102 to ensure operational correctness of the boot storage 114. One or more foreground processes 120, 122 store (at block 504) a system configuration data 124 of the storage controller 102 in the boot storage 114 of the storage controller 102.

From block 504 control proceeds to block 506 in which, the background process 116 and the one or more foreground processes 120, 122 are executed to meet predetermined performance requirements for the background process 116 and the one or more foreground processes 120, 122, where the predetermined performance requirements include executing the background process 116 at least once in a predetermined interval of time, and completing execution of each of the one or more foreground processes 120, 122 within a predetermined amount of time.

Therefore, FIGS. 1-5 illustrate certain embodiments in which the execution of a background process 116 and one or more foreground processes 120, 122 are balanced in a storage controller 102.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
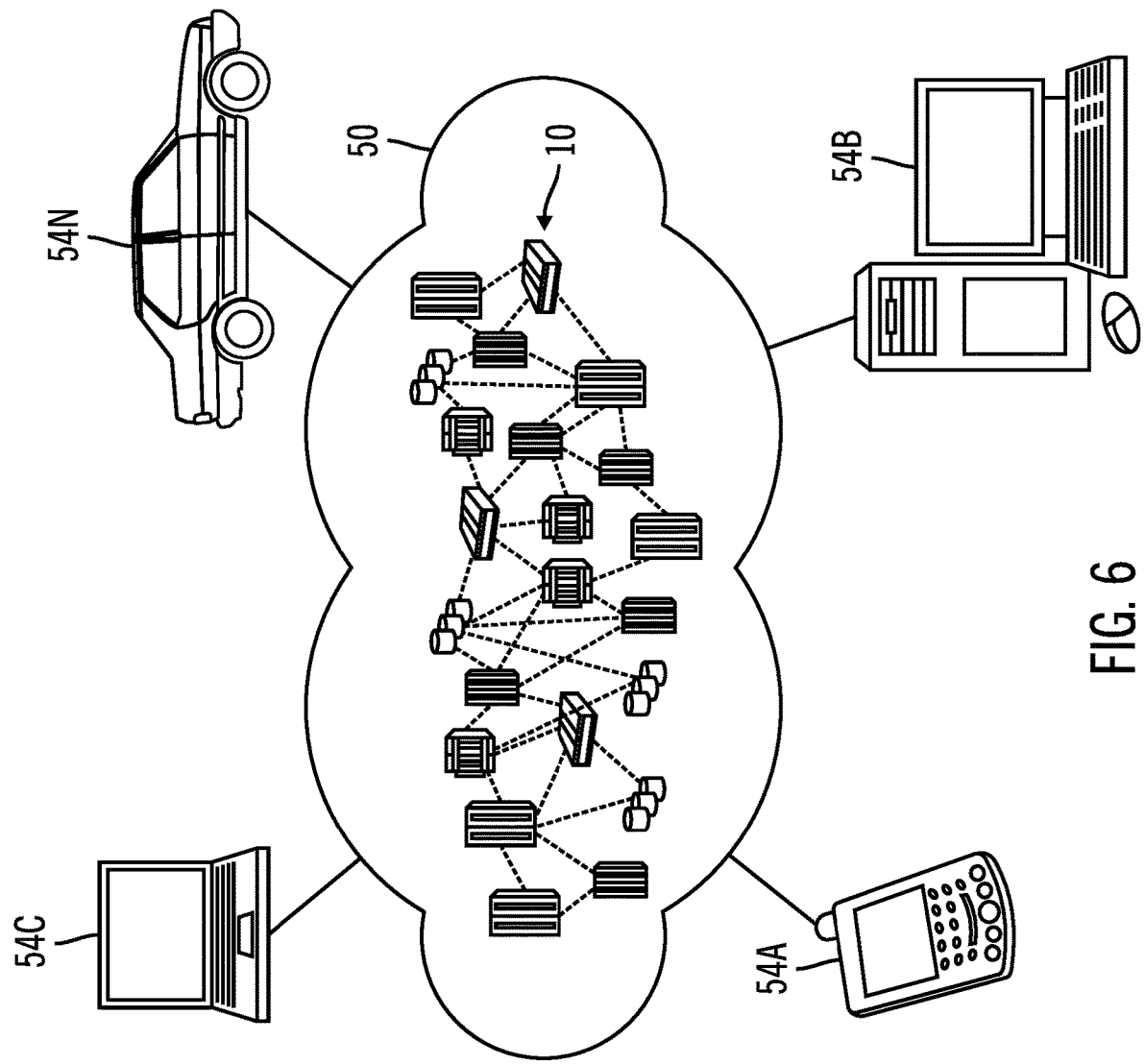
FIG. 6 illustrates a block diagram of a cloud computing environment, in accordance with certain embodiments.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
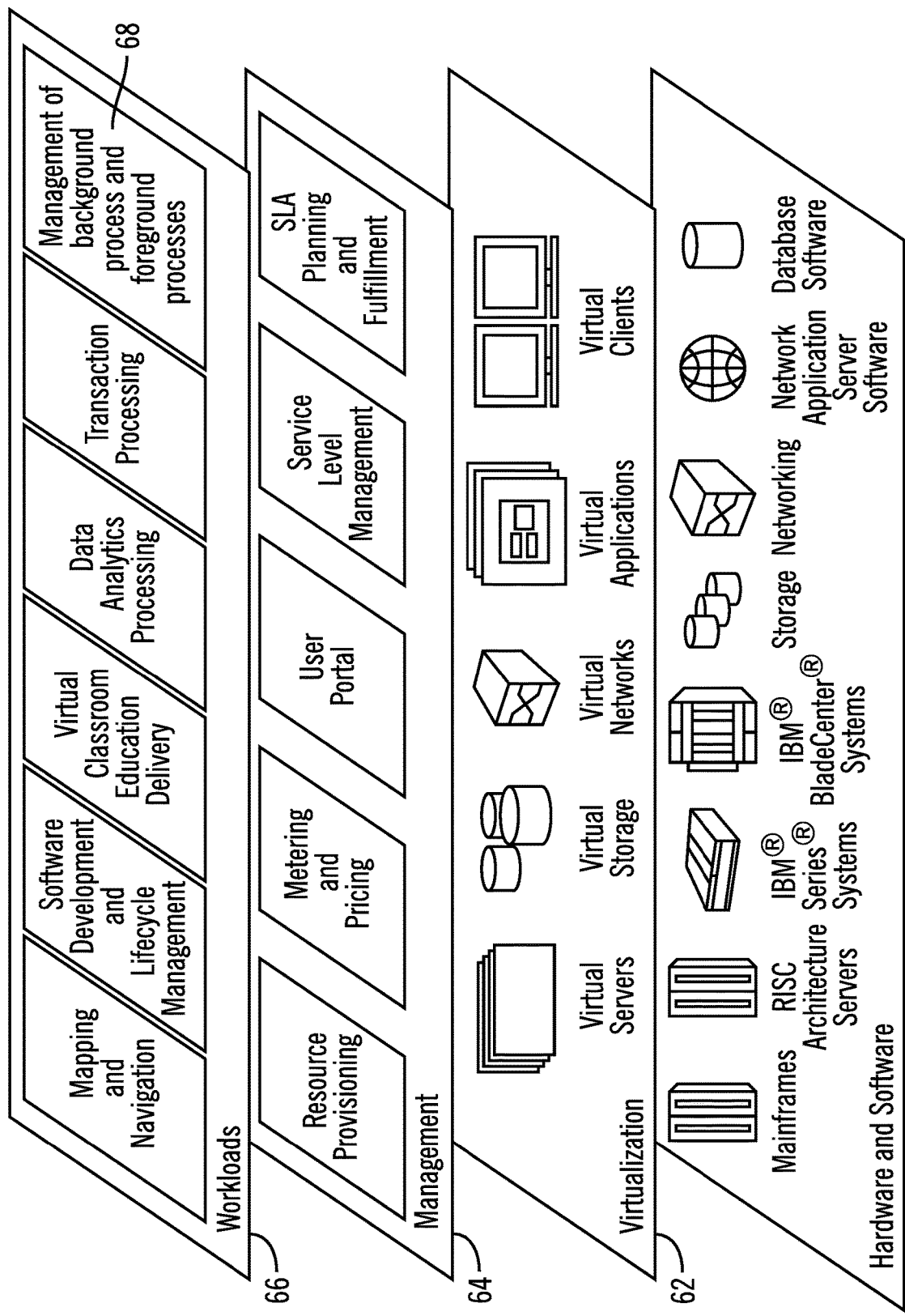
FIG. 7 illustrates a block diagram of further details of the cloud computing environment of FIG. 7, in accordance with certain embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and management of background process and foreground processes 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
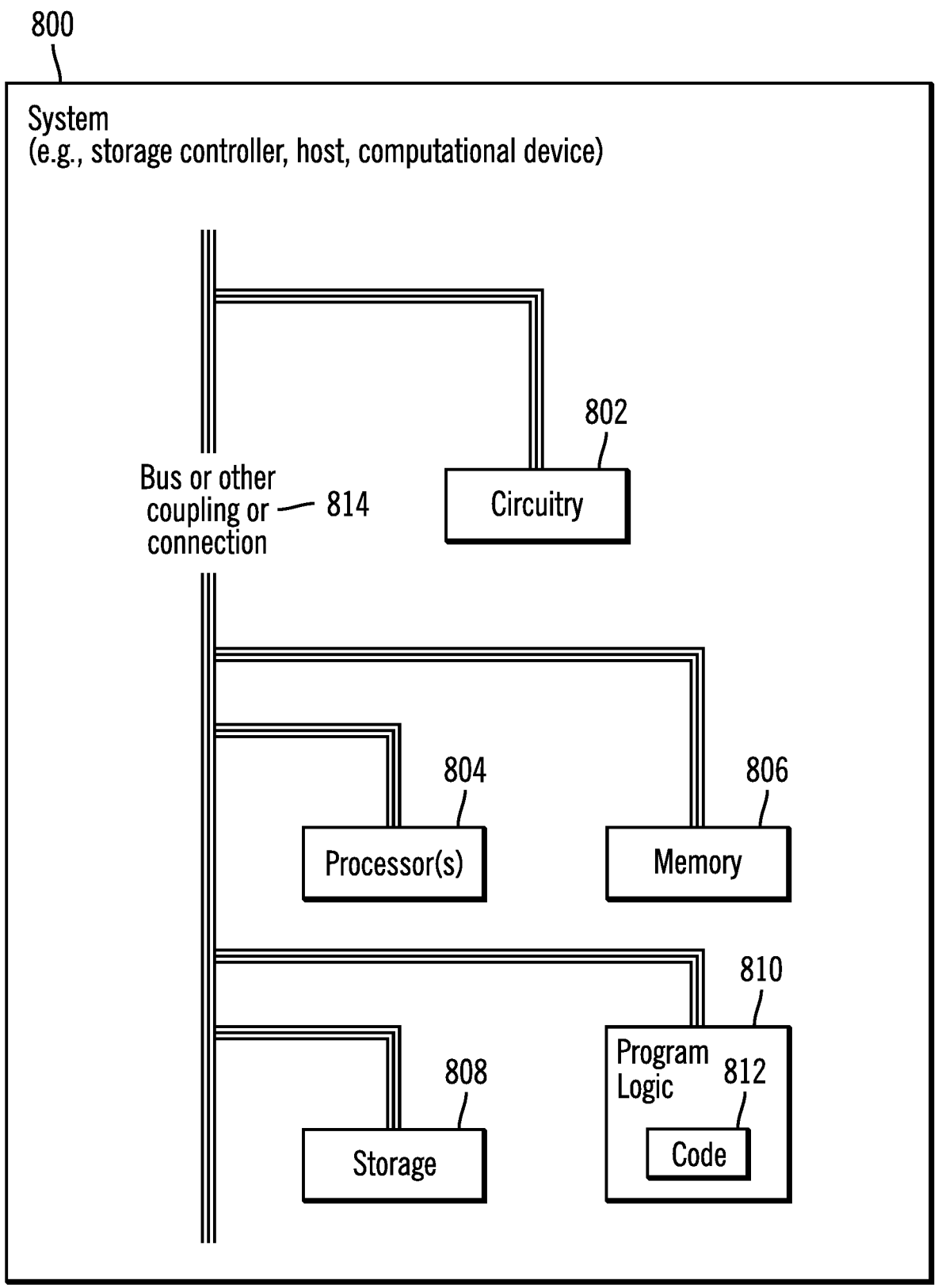
FIG. 8 illustrates a block diagram of a computational system that shows certain elements that may be included in the storage controllers and/or the host(s), as described in FIGS. 1-7, in accordance with certain embodiments.

FIG. 8 illustrates a block diagram that shows certain elements that may be included in the storage controller 101, the hosts 104, or other computational devices in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. One or more of the components in the system 800 may communicate via a bus or via other coupling or connection 814. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    configuring a background process to periodically scrub a boot storage of a storage controller to ensure operational correctness of the boot storage;
    storing, via one or more foreground processes, a system configuration data of the storage controller in the boot storage of the storage controller; and
    executing the background process and the one or more foreground processes to meet predetermined performance requirements for the background process and the one or more foreground processes, wherein a priority of the background process is set based on how many times the background process has been aborted since a last completion of the background process.

2. The method of claim 1, wherein the predetermined performance requirements include executing the background process at least once in a predetermined interval of time.

3. The method of claim 1, wherein the predetermined performance requirements include completing execution of each of the one or more foreground processes within a predetermined amount of time.

4. The method of claim 1, wherein the background process is configurable to have at least two priorities including a low priority and a high priority, wherein the high priority is a higher priority than the low priority.

5. The method of claim 1, the method further comprising:
    starting execution of the background process; and
    in response to completion of the execution of the background process, reducing a priority of the background process.

6. The method of claim 5, the method further comprising:
    in response to determining that the execution of the background process has not completed in a predetermined amount of time, increasing the priority of the background process.

7. A system, comprising:
    a memory; and
    a processor coupled to the memory, wherein the processor performs operations, the operations performed by the processor comprising:
        configuring a background process to periodically scrub a boot storage of a storage controller to ensure operational correctness of the boot storage;
        storing, via one or more foreground processes, a system configuration data of the storage controller in the boot storage of the storage controller; and
        executing the background process and the one or more foreground processes to meet predetermined performance requirements for the background process and the one or more foreground processes, wherein a priority of the background process is set based on how many times the background process has been aborted since a last completion of the background process.

8. The system of claim 7, wherein the predetermined performance requirements include executing the background process at least once in a predetermined interval of time.

9. The system of claim 7, wherein the predetermined performance requirements include completing execution of each of the one or more foreground processes within a predetermined amount of time.

10. The system of claim 7, wherein the background process is configurable to have at least two priorities including a low priority and a high priority, wherein the high priority is a higher priority than the low priority.

11. The system of claim 7, the operations further comprising:
    starting execution of the background process; and
    in response to completion of the execution of the background process, reducing a priority of the background process.

12. The system of claim 11, the operations further comprising:
    in response to determining that the execution of the background process has not completed in a predetermined amount of time, increasing the priority of the background process.

13. A computer program product, the computer program product comprising a computer readable storage medium having computer readable program code embodied therewith, the computer readable program code configured to perform operations, the operations comprising:
    configuring a background process to periodically scrub a boot storage of a storage controller to ensure operational correctness of the boot storage;
    storing, via one or more foreground processes, a system configuration data of the storage controller in the boot storage of the storage controller; and
    executing the background process and the one or more foreground processes to meet predetermined performance requirements for the background process and the one or more foreground processes, wherein a priority of the background process is set based on how many times the background process has been aborted since a last completion of the background process.

14. The computer program product of claim 13, wherein the predetermined performance requirements include executing the background process at least once in a predetermined interval of time.

15. The computer program product of claim 13, wherein the predetermined performance requirements include completing execution of each of the one or more foreground processes within a predetermined amount of time.

16. The computer program product of claim 13, wherein the background process is configurable to have at least two priorities including a low priority and a high priority, wherein the high priority is a higher priority than the low priority.

17. The computer program product of claim 13, the operations further comprising:
    starting execution of the background process; and
    in response to completion of the execution of the background process, reducing a priority of the background process.

18. The computer program product of claim 17, the operations further comprising:
    in response to determining that the execution of the background process has not completed in a predetermined amount of time, increasing the priority of the background process.

* * * * *